(12) United States Patent
Stevens

(10) Patent No.: US 6,424,179 B1
(45) Date of Patent: Jul. 23, 2002

(54) LOGIC UNIT AND INTEGRATED CIRCUIT FOR CLEARING INTERRUPTS

(75) Inventor: Ashley Miles Stevens, Stow-Cum-Quy (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 09/788,678

(22) Filed: Feb. 21, 2001

(30) Foreign Application Priority Data

Nov. 3, 2000 (GB) .............................................. 0026941

(51) Int. Cl.[7] .............................................. H03K 19/00
(52) U.S. Cl. ............................ 326/93; 326/82; 327/145
(58) Field of Search .............................. 326/93, 95, 96, 326/97, 98, 82, 83, 86, 89, 90; 327/144, 145

(56) References Cited

U.S. PATENT DOCUMENTS

| 4,525,849 A | * | 7/1985 | Wolf ........................... 365/221 |
| 5,900,753 A | * | 5/1999 | Cote et al. ................... 327/145 |
| 6,175,257 B1 | * | 1/2001 | Ramanadin ................. 327/141 |

* cited by examiner

Primary Examiner—Don Phu Le
(74) Attorney, Agent, or Firm—Nixon & Vanderhye P.C.

(57) ABSTRACT

The present invention provides a logic unit and integrated circuit for clearing interrupts. The logic unit is coupled to a bus operating in a first clock domain, and is arranged to interface between the bus and a device operating in a second clock domain, the frequency of the second clock domain being less than the frequency of the first clock domain. In accordance with the present invention, the logic unit comprises an interrupt source, responsive to a signal issued by the device, to assert a first interrupt signal in the second clock domain, and output logic, responsive to the first interrupt signal-to output a second interrupt signal via the bus to a processor operating in the first clock domain. The processor is arranged to process the interrupt indicated by the second interrupt signal, and to issue a clear request signal at a predetermined point during processing of the interrupt. The logic unit also includes clear generation logic arranged, whilst the first interrupt signal is asserted, to be responsive to receipt of the clear request signal to assert a clear signal to the interrupt source and to assert a control signal to the output logic. The output logic is responsive to receipt of the control signal to stop outputting the second interrupt signal, whilst the interrupt source is responsive to the clear signal to de-assert the first interrupt signal, the de-assertion of the first interrupt signal causing a clear acknowledge signal to be generated. The clear generation logic is then responsive to the clear acknowledge signal to de-assert the clear signal. This approach enables an interrupt generated in the second clock domain to be efficiently cleared without impacting the efficiency of the processor operating in the first clock domain.

12 Claims, 5 Drawing Sheets

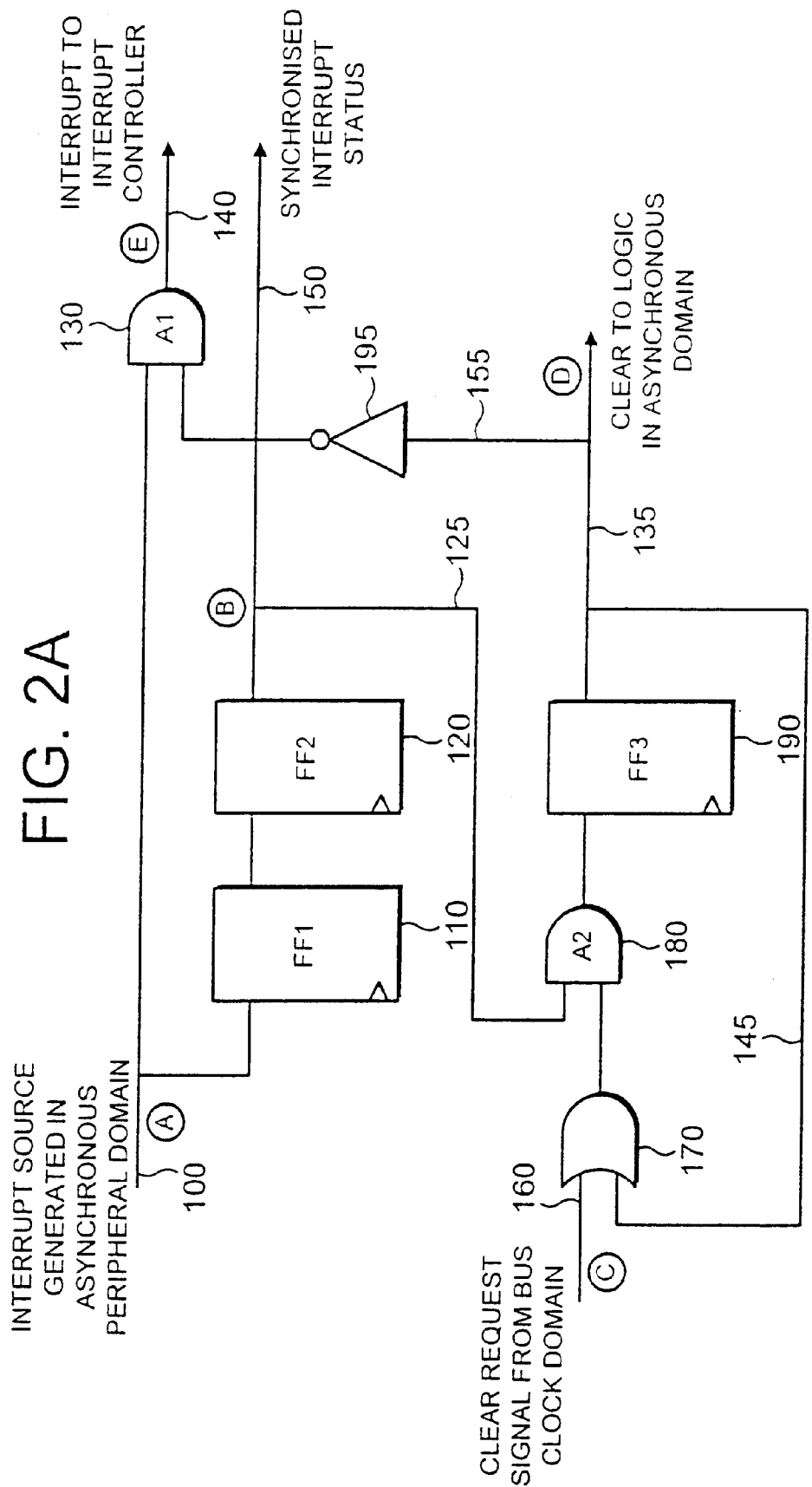

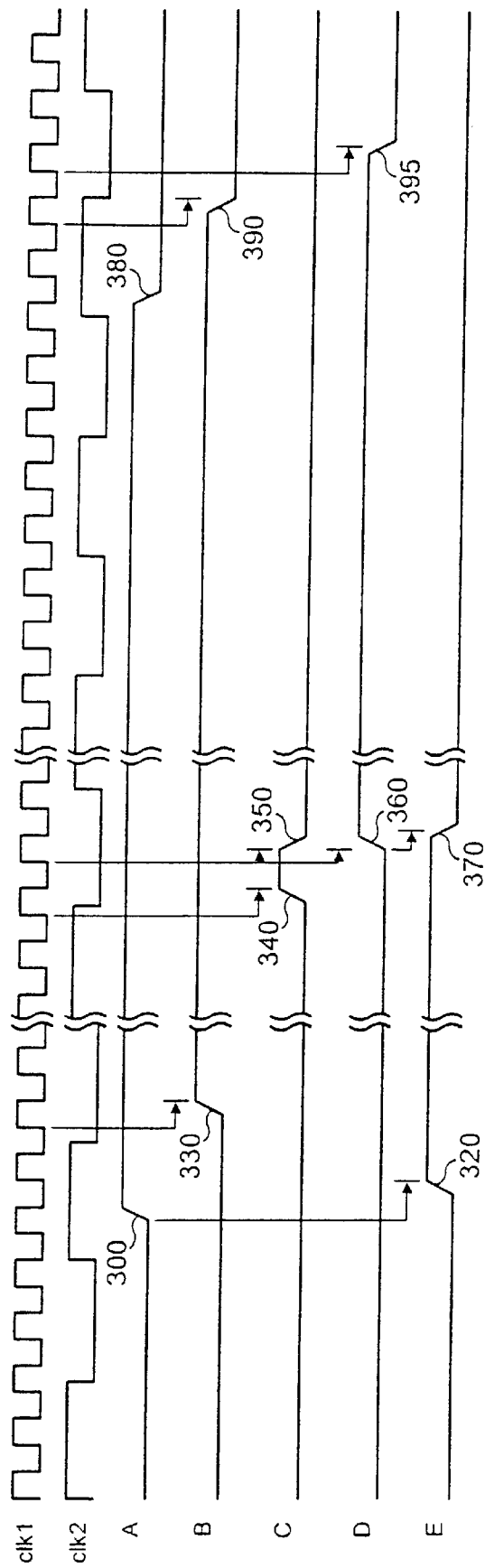

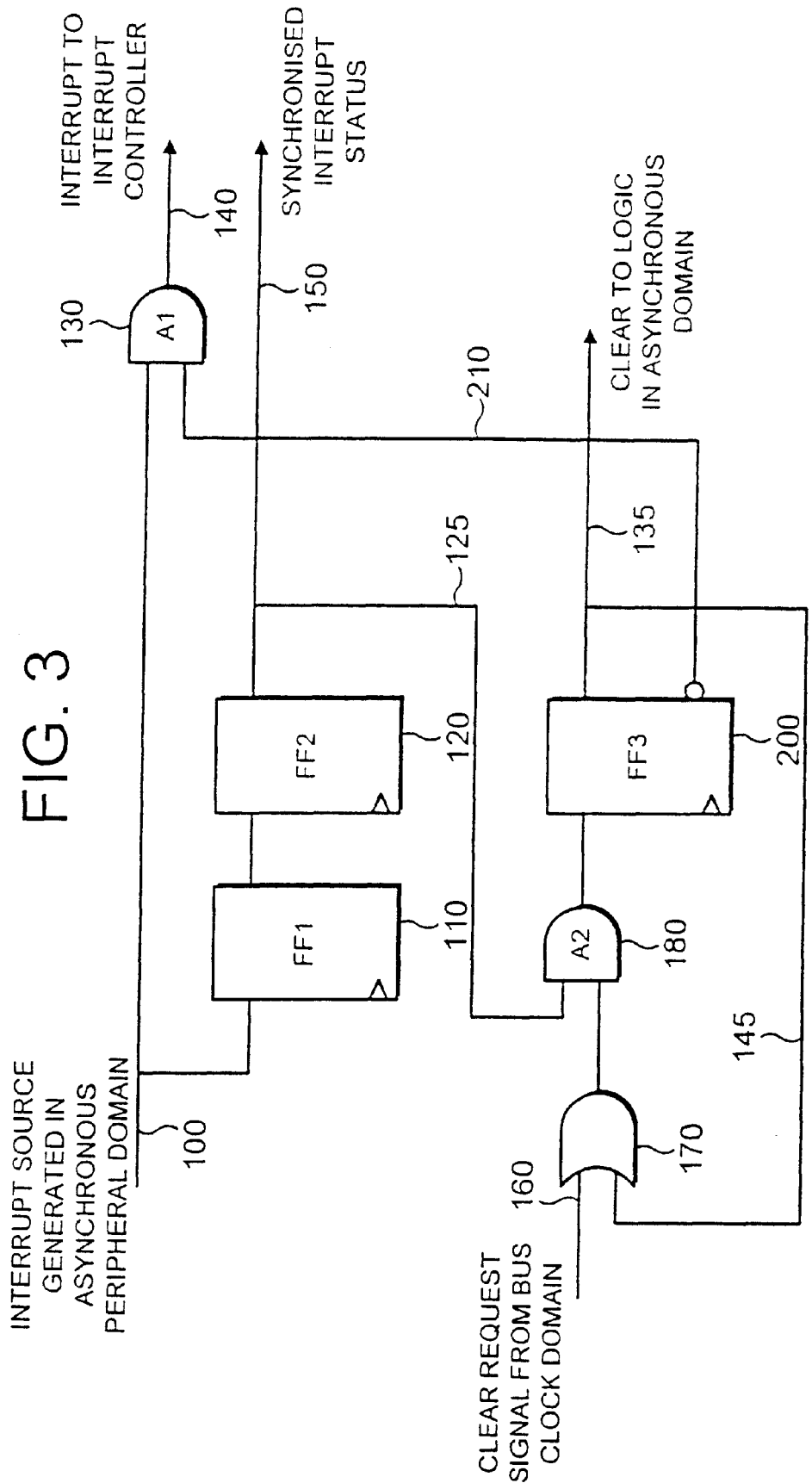

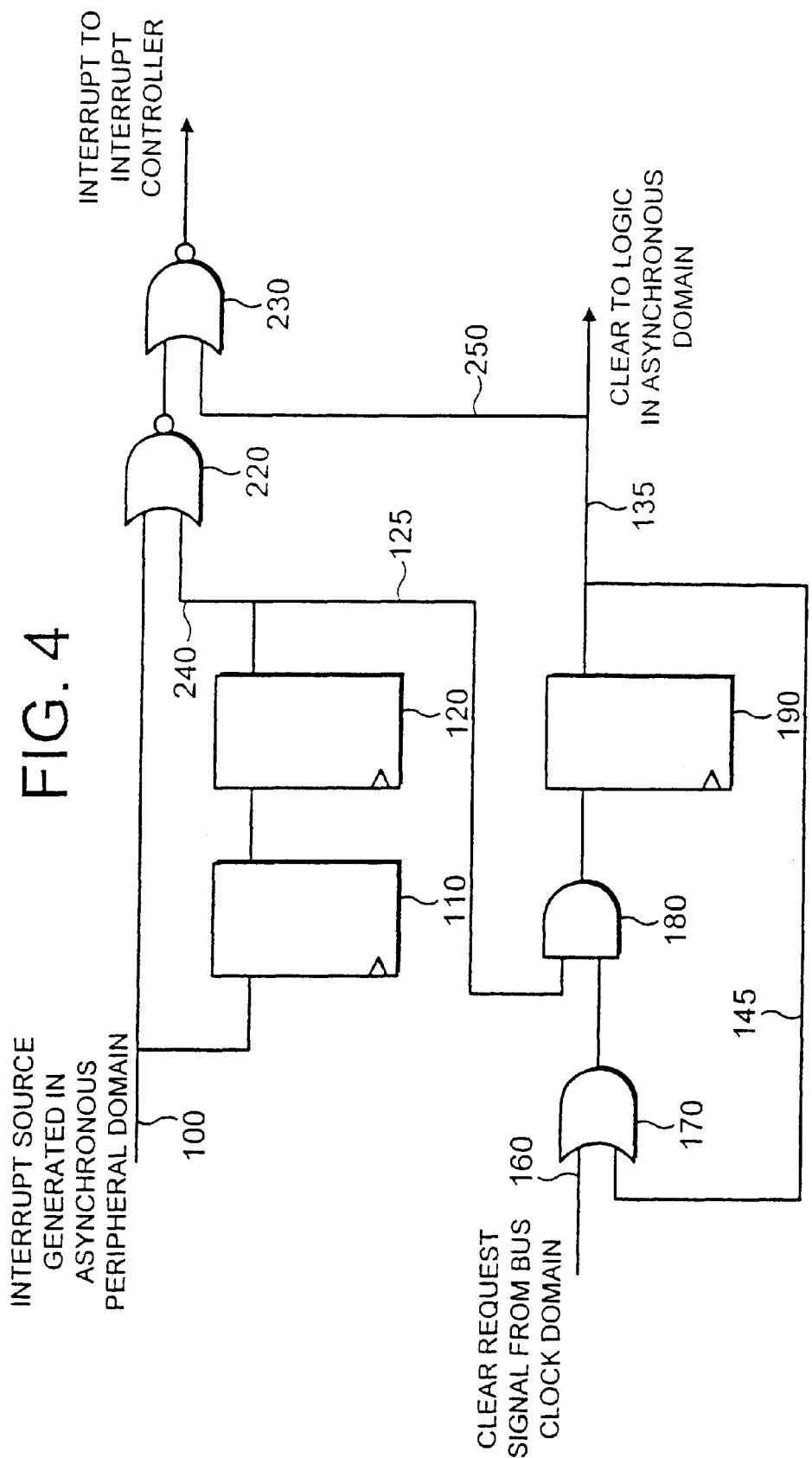

LOGIC UNIT AND INTEGRATED CIRCUIT FOR CLEARING INTERRUPTS

BACKGROUND OF THE INVENTION

1. Field of the Invention

The present invention relates to a logic unit and integrated circuit for clearing interrupts, and in particular to a logic unit and integrated circuit for efficiently clearing interrupts generated in a clock domain operating at a lower frequency than the clock domain in which the processor processing the interrupt is operating.

2. Description of the Prior Art

It is known to provide a processor for performing a number of processing operations, including the processing of interrupts, and to couple that processor via one or more buses to a number of logic units. The bus may be arranged to operate in a first clock domain, and a logic unit may be used to interface between the bus and a device operating in a second clock domain. As an example, the logic unit may form a peripheral interface for interfacing between the bus and a peripheral device. In many implementations, the peripheral device will use a peripheral clock which is significantly slower than the clock used to clock the bus. Considering a specific example, the bus may be operating in a first clock domain with a bus clock operating at 100 MHz. In contrast, a peripheral interface such as a "Universal Asynchronous Receive and Transmit" (UART) logic unit may be arranged to use a 1.8432 MHz clock used in the clock domain of the peripheral device (the second clock domain).

A logic unit, such as a UART, will receive signals from its associated peripheral device, and when required will generate an interrupt signal in the slow clock domain. This interrupt signal will be passed over the bus to the processor, where the processor will then process that interrupt. At an appropriate point during processing of the interrupt, for example when the interrupt is received by the processor, or when the interrupt has been processed by the processor, the processor will typically be arranged to issue a clear request signal to cause the interrupt to be cleared. However, it will be appreciated that it will take several clock cycles in the high speed clock domain of the processor to clear the interrupt, since the interrupt must be cleared in the slow clock domain of the peripheral device. This causes a problem in that, if the circuitry is not designed correctly, it is possible for the processor to have written the clear command and then to have returned to normal processing, only to be re-interrupted by the original interrupt signal, since the interrupt is still present in the slow clock domain.

One way to avoid this problem is to halt the processor until the interrupt is cleared in the slow clock domain. However, it will be appreciated that this approach will waste processor clock cycles, thereby impacting on the efficiency of the processor.

Accordingly, it is desirable to provide a technique for more efficiently clearing interrupts generated in the slow clock domain.

SUMMARY OF THE INVENTION

Viewed from a first aspect, the present invention provides a logic unit for coupling to a bus operating in a first clock domain, and for interfacing between the bus and a device operating in a second clock domain, the frequency of the second clock domain being less than the frequency of the first clock domain. the logic unit comprising: an interrupt source, responsive to a signal issued by the device, for asserting a first interrupt signal in the second clock domain; output logic, responsive to the first interrupt signal, to output a second interrupt signal via the bus to a processor operating in the first clock domain, the processor being arranged to process the interrupt indicated by the second interrupt signal, and to issue a clear request signal at a predetermined point during processing of the interrupt; clear generation logic arranged, whilst the first interrupt signal is asserted, to be responsive to receipt of the clear request signal to assert a clear signal to the interrupt source and to assert a control signal to the output logic; the output logic being responsive to receipt of the control signal to stop outputting the second interrupt signal; the interrupt source being responsive to the clear signal to de-assert the first interrupt signal, the de-assertion of the first interrupt signal causing a clear acknowledge signal to be generated; the clear generation logic being responsive to the clear acknowledge signal to de-assert the clear signal.

In accordance with the present invention, when the logic unit generates a first interrupt signal in the second clock domain, output logic is arranged to conditionally output that first interrupt signal as a second interrupt signal which is then sent via the bus to a processor, the processor being arranged to process the interrupt and to issue a clear request signal at a predetermined point during processing of the interrupt. As mentioned earlier, this predetermined point may be any suitable point during processing of the interrupt, and in preferred embodiments the clear request signal is sent by the processor once the interrupt has been processed. Alternatively, however. it will be appreciated that the clear request signal may be issued upon receipt of the interrupt by the processor.

Further, clear generation logic is provided which is responsive to receipt of the clear request signal, to assert a clear signal to the interrupt source and to assert a control signal to the output logic. The control signal causes the output logic to stop outputting the second interrupt signal,. and hence the processor is clear to continue with other processing. At this stage, the first interrupt signal is still being asserted by the interrupt source. However, the clear signal is used by the interrupt source to de-assert the first interrupt signal. A clear acknowledge signal is then generated to indicate when the first interrupt signal has been de-asserted. Whilst this de-assertion of the first interrupt signal is taking place, the clear generation logic continues to assert the clear signal. However, upon receipt of the clear acknowledge signal, the clear generation logic is arranged to de-assert the clear signal.

By the above approach, it will be seen that the second interrupt signal ceases to be output by the logic unit upon receipt of the clear request signal from the processor, the clear request signal also causing a clear signal to be asserted by the logic unit to the interrupt source. At this point, the processor can then return to performing further processing operations whilst the logic unit takes responsibility for then clearing the first interrupt signal using the asserted clear signal. Once the first interrupt signal in the second clock domain is de-asserted, a clear acknowledge signal is then generated to cause the clear signal to be de-asserted, to thereby return the relevant logic to its original state.

It will be appreciated that the clear acknowledge signal may be a separate signal generated once the first interrupt signal is de-asserted. However, in preferred embodiments, the clear generation logic is arranged to receive the first interrupt signal, and the de-asserted first interrupt signal forms the clear acknowledge signal. This provides simplification in the design, since the interrupt source output is also used directly as the clear acknowledge signal. Hence, the first interrupt signal being reset is used as a clear acknowledge signal to the clear generation logic, to enable the clear generation logic to then de-assert the clear signal being used to cause the first interrupt signal to be reset.

It will be appreciated that the clear generation logic may be embodied in a variety of ways. However, in preferred embodiments, the clear generation logic is arranged to operate in the first clock domain, and the logic unit further comprises resynchronisation logic for resynchronising the first interrupt signal to the first clock domain.

In preferred embodiments, the clear generation logic is arranged to receive the clear request signal as a set signal and the clear acknowledge signal as a rest signal, whereby the clear generation logic is arranged to assert the clear signal upon receipt of the clear request signal, and to maintain the clear signal until the clear acknowledge signal is received, at which point the clear signal is de-asserted.

In preferred embodiments, a "set" or "asserted" signal has a logic "1" value, and a "reset" or "de-asserted" signal has a logic "0" value, although it will be appreciated by those skilled in the art that this may readily be reversed, depending on the specific implementation.

In preferred embodiments, the clear generation logic comprises a first logic element arranged to receive the clear request signal and the output of the clear generation logic and a second logic element arranged to receive the output of the first logic element and the clear acknowledge signal, the two logic elements being arranged such that the clear signal is asserted upon receipt of the clear request signal, and is maintained irrespective of whether the clear request signal is maintained until such time as the clear acknowledge signal is received. It will be appreciated that the first and second logic elements may take a variety of forms, and indeed may be embodied within a single piece of logic. However, in preferred embodiments, the first logic element is a logical OR gate, and the second logic element is a logical AND gate.

It will be appreciated that the output logic may be embodied in a variety of ways. However, in preferred embodiments, the output logic comprises a logic gate arranged to conditionally output the first interrupt signal as the second interrupt signal dependent on whether the control signal is asserted.

In accordance with a first embodiment, the clear signal forms the control signal, and the output logic comprises an inverter for inverting the control signal, and a logical AND gate for receiving the first interrupt signal and the inverted control signal, whereby the first interrupt signal is output as the second interrupt signal until the clear signal is asserted, at which point the logical AND gate stops outputting the second interrupt signal.

In an alternative embodiment. the clear signal forms the control signal, and the output logic comprises a logical NOR gate for receiving an inverted version of the first interrupt signal and the control signal, whereby the first interrupt signal is output as the second interrupt signal until the clear signal is asserted, at which point the logical NOR gate stops outputting the second interrupt signal.

In a further embodiment, the clear generation logic is arranged to generate the control signal as an inverted version of the clear signal, and the output logic comprises a logical AND gate for receiving the first interrupt signal and the control signal, whereby the first interrupt signal is output as the second interrupt signal until the clear signal is asserted, at which point the logical AND gate stops outputting the second interrupt signal.

It will be appreciated by those skilled in the art that the above three examples of the output logic are not the only possible implementations. and that any other arrangement may be used to cause the first interrupt signal to be conditionally output as the second interrupt signal dependent on the assertion of the control signal.

In certain implementations, it is possible that any particular logic unit may generate interrupt signals for a variety of reasons. To enable the processor to correctly process the interrupt, it may need to determine the type of interrupt that has occurred. Accordingly, in preferred embodiments, the logic unit further comprises a register for storing as interrupt status information the first interrupt signal as resynchronised to the first clock domain, the register being accessible by the processor during processing of the interrupt. Preferably, a separate register is provided for each type of interrupt, and accordingly the processor can determine based on the presence of interrupt status information within a particular register the type of interrupt that has occurred.

Viewed from a second aspect, the integrated circuit comprises: a processor for processing interrupts; a logic unit in accordance with the first aspect of the present invention; and a bus for coupling the logic unit and the processor.

In preferred embodiments. the integrated circuit further comprises an interrupt controller coupled to the bus, and arranged to receive the second interrupt signal from the output logic, and to determine when to pass the interrupt to the processor for processing. It will be appreciated that the interrupt controller may be integrated as part of the processor, or may be formed as a separate unit. In preferred embodiments, the interrupt controller is a separate unit to the processor, and is arranged to enable or disable the interrupts, and optionally to prioritise the various interrupt signals destined for the processor.

BRIEF DESCRIPTION OF THE DRAWINGS

The present invention will be described further, by way of example only, with reference to preferred embodiments thereof as illustrated in the accompanying drawings, in which:

FIG. 2A is a block illustrating circuitry provided within a logic unit in accordance with a first embodiment of the present invention;

FIG. 2B is the timing diagram illustrating the relative timings of various signals generated within the circuit of FIG. 2A; and FIGS. 3 and 4 represent alternative embodiments of the circuitry of FIG. 2A.

DESCRIPTION OF PREFERRED EMBODIMENTS

Figure 1:
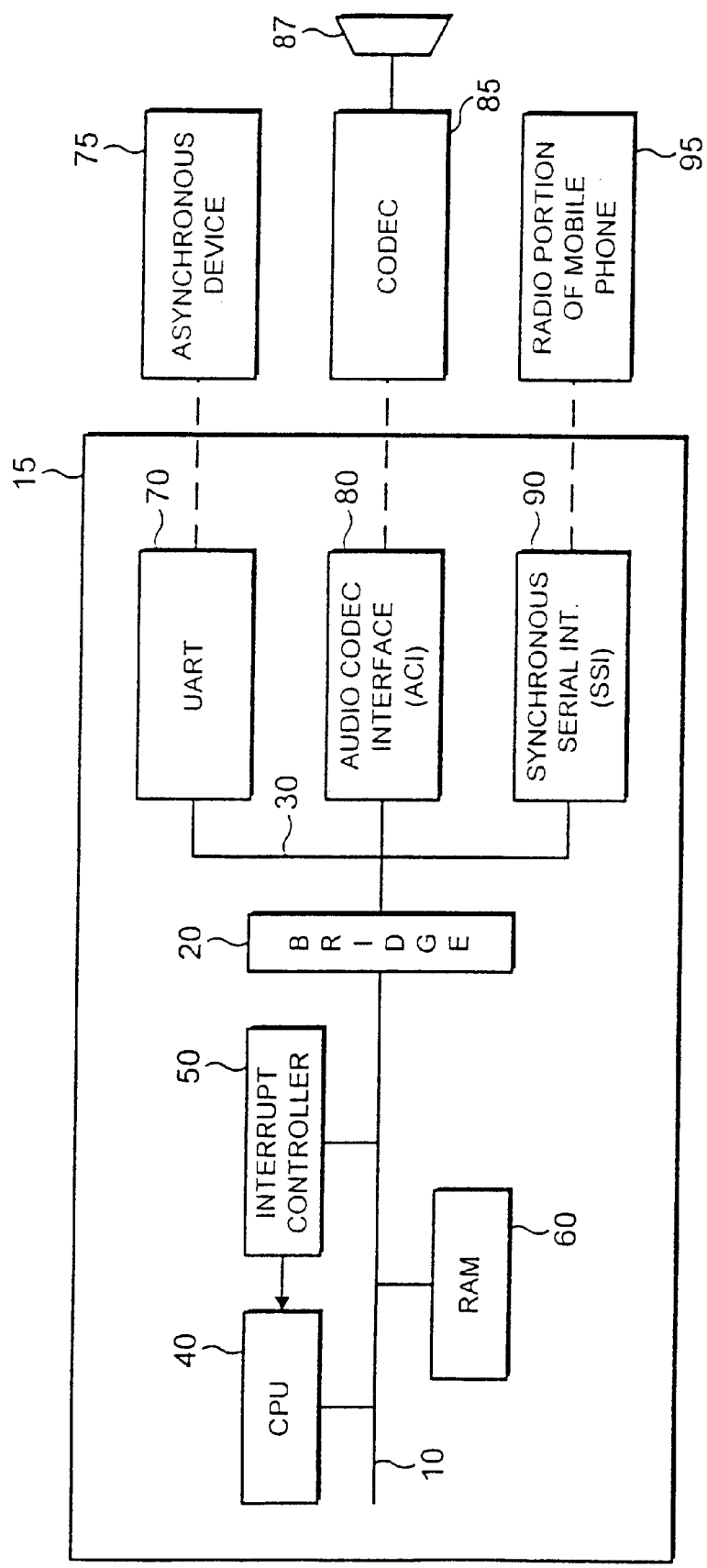
FIG. 1 is a block diagram illustrating an integrated circuit in which a logic unit in accordance with preferred embodiments of the present invention may be employed.

FIG. 1 illustrates an example of an integrated circuit in which a logic unit of preferred embodiments of the present invention may be employed. Preferably, the integrated circuit takes the form of a microcontroller chip or System on Chip (SoC) 15, which may be used within a device such as a personal organiser, a mobile phone, a television set top box, etc.

The chip 15 has a system bus 10 and a peripheral bus 30 connected via a bridge circuit 20. For the sake of illustration, these buses will be considered to operate in accordance with the "Advanced Microcontroller Bus Architecture" (AMBA)

specification developed by ARM Limited. The ARUBA specification defines an on-chip communication standard for designing high performance 32-bit and 16-bit embedded microcontrollers, with the system bus 10 being used for high performance system modules, whilst the peripheral bus 30 is used for low power peripheral devices. The high performance system bus 10 is able to sustain the external memory bandwidth, with the CPU and other Direct Memory Access devices residing on the system bus, whilst a bridge circuit 20 connects the system bus to a narrower peripheral bus 30 on which the low bandwidth peripheral devices are located. The bridge circuit 20 performs the necessary protocol conversion between the system bus 10 and the peripheral bus 30.

Whilst the above architecture is used for the purpose of illustrating a preferred embodiment, it will be appreciated that such an architecture is not required, a indeed all of the devices may be connected to a single bus. Indeed, even in the FIG. 1 example, the system bus and peripheral bus can logically be considered as a single bus. and in preferred embodiments these buses operate in the same high frequency clock domain. hereafter referred to as the first clock domain.

The chip 15 may have a number of logic units connected to the system bus 10, but for the sake of illustrating the preferred embodiment of the present invention only a few devices have been illustrated. In particular, a Central Processing Unit (CPU) 40 is connected to the system bus 10, and arranged to perform a number of processing operations. Data and instructions required by the CPU 40 may be stored within RAM 60, and output to the CPU 40 as and when required via the system bus 10.

Further, an interrupt controller 50 is provided for receiving any interrupts to be handled by the CPU 40, and for prioritising those interrupts. The interrupt controller 50 will then send a signal to the CPU 40 when it determines that the CPU should process an interrupt received by the interrupt controller 50.

In preferred embodiments of the present invention, a number of peripheral interface units may be connected to the peripheral bus 30, although for the sake of illustration of the preferred embodiment, only three peripheral interface units are illustrated. Firstly, a "Universal Asynchronous Receive and Transmit" (UART) logic unit 70 is provided for receiving and transmitting serial data, and hence for example is connected to an asynchronous device 75. It will be appreciated that the asynchronous device 75 can be any appropriate asynchronous device. However, assuming that the chip 15 resides within a personal organiser, the asynchronous device 75 may for example be a Personal Computer (PC) with which the personal organiser is to exchange data.

A further example of a peripheral interface unit is an audio CODEC interface (ACI) 80, which is used to interface to a CODEC 85 connected, for example, to a speaker 87 via an amplifier, and/or to a microphone. By using the ACI 80, audio data may be input and/or output from the chip 15.

Additionally, a Synchronous Serial Interface (SSI) 90 may be provided, which may be coupled to any suitable device, for example the radio portion of a mobile phone 95, or to an attached Digital Signal Processor (DSP) chip in the form of a CPU optimised for repetitive mathematical operations commonly used in mobile phone applications.

It will be appreciated that any one of the peripheral interface units 70, 80 and 90 may need at certain points to generate interrupt signals to cause the CPU 40 to process certain interrupts. FIG. 2A illustrates circuitry that may be provided within any or all of these peripheral interface units 70, 80 and 90 to handle the generation and clearing of such interrupt signals. It should be noted that if any single peripheral interface unit contains more than one source of interrupt, for example "ready to send" and "received" and "error", then the circuitry in FIG. 2A would preferably be repeated for each of these interrupt sources.

When an interrupt signal is to be generated, an interrupt source within the peripheral interface unit (hereafter referred to as the logic unit) will generate a first interrupt signal which appears over path 100. In FIG. 2A, each of the flip flops 110, 120 and 190 are initially reset to a logic zero value by a global reset, and accordingly a logic zero value will be present on paths 135 and 155, thereby causing the AND gate 130 to receive a logic one value output by the inverter 195. When an interrupt is generated, the first interrupt signal on path 100 will also have a logic one value, and accordingly the AND gate 130 will output as a second interrupt signal a logic one value over path 140. This second interrupt signal will be issued over the peripheral bus 30 and the system bus to the interrupt controller 50, where it is scheduled for processing by the CPU 40. Accordingly, it can be seen that the AND gate 130 is arranged to pass the interrupt signal in the asynchronous clock domain (hereafter referred to as the second clock domain) directly to the interrupt controller, thereby ensuring that there is no re-synchronisation delay in the peripheral, and that thus the interrupt latency is not affected by the presence of the circuitry in FIG. 2A.

Flip flops 110 and 120 are used in a standard manner to re-synchronise with the high speed first clock domain the first interrupt signal generated in the slow second clock domain, and the resynchronised first interrupt signal is output over path 150 to a predetermined register within the logic unit where it provides interrupt status information that is accessible by the processor during processing of the interrupt. This information can be used, for example, to enable the processor to determine the type of interrupt that has occurred.

In addition, the resynchronised first interrupt signal is passed over path 125 to AND gate 180. Logic elements 170, 180 and 190 together form a clear generation logic which is used to issue a clear signal to the interrupt source once a clear request signal is generated by the processor. More particularly, as mentioned earlier, at initiation the signal on path 135 is a logic zero value. In addition, the processor will not yet have generated a clear request signal, and accordingly a logic zero value will be present over path 160. This causes the output of the OR gate 170 to be a logic zero value, which thereby causes the output of AND gate 180 to also be at a logic zero value.

However, at some point during processing of the interrupt by the CPU 40, for example once the interrupt has been processed by the CPU 40, the CPU 40 will issue a clear request signal. In preferred embodiments, this will be done by the CPU 40 writing a logic one value to a particular register within the peripheral address map, this particular register preferably residing on the logic unit incorporating the circuitry of FIG. 2A. This will cause a clear request signal to be input over path 160 in the first clock domain, thereby causing the output of the OR gate 170 to transition to a logic one value. Since the first interrupt signal is still asserted, this will cause the output of AND gate 180 to also transition to a logic one value, which will then cause the output of flip flop 190 to transition to a logic one value on the rising edge of the next clock signal in the first clock domain. At this point, a logic one value will then be present over path 155, causing a logic zero value to be output by inverter 195 to the AND gate 130, thereby turning off the second interrupt signal. Hence, at this point, the interrupt controller will no longer receive the interrupt signal, even though the first interrupt signal is still being generated in the second clock domain by the interrupt source.

In preferred embodiments, the clear request signal will only be asserted for a single clock cycle in the first clock domain. However, since the output of flip flop 190 will have transitioned to a logic one value, and this output is then fed as an input to the OR gate 170, the output of OR gate 170 will be maintained at a logic one value. even if the clear request signal is removed. Accordingly, upon receipt of the clear request signal over path 160, a clear signal is asserted over path 135, and this signal continues to be asserted even after the clear request signal stops being issued.

This clear signal as output over path 135 can be re-synchronised to the second clock domain using any of a number of standard techniques, and preferably this re-synchronised clear signal is input to the interrupt source to cause the interrupt source to clear the first interrupt signal.

The first interrupt signal can now be cleared in the slow second clock domain without any impact on the operating efficiency of the CPU 40 operating in the high speed first clock domain. Once the first interrupt signal is de-asserted in response to the clear signal issued over path 135, flip flops 110 and 120 will generate a re-synchronised version of the de-asserted first interrupt signal, which is used to reset the register over path 150, and also to provide a clear acknowledge signal over path 125 to AND gate 180. This clear acknowledge signal will be at a logic zero value, and will accordingly cause the output of AND gate 180 to transition to a logic zero value. On the next rising edge of the clock signal in the first clock domain, the output of flip flop 190 will also transition to a logic zero value, which will cause the clear signal to be de-asserted, and will also cause a logic one value to be reinstated at the input of AND gate 130 from inverter 195. However, at this stage, the first interrupt signal has been de-asserted, and hence the other input of AND gate 130 is at a logic zero value. Thus, the second interrupt signal will remain de-asserted at the output of AND gate 130.

Hence, it can be seen that the circuitry of FIG. 2A enables a clear request signal generated by the processor to cause the interrupt signal issued to the interrupt controller to be de-asserted in the first clock domain, thereby freeing up the CPU 40 to continue with other processing, whilst at the same time a clear signal is generated to cause the interrupt source to de-assert the first interrupt signal in the first clock domain. The clear signal continues to be maintained until a clear acknowledge signal is received over path 125, and in the FIG. 2A embodiment, the clear acknowledge signal is actually formed directly by the de-asserted version of the first interrupt signal. The clear acknowledge signal is then used to enable the clear generation logic to be reset and to reset the inputs of AND gate 130, so that it is ready to respond when the next interrupt signal is generated.

FIG. 2B is a timing diagram illustrating the high speed clock (CLK1) of the first clock domain and the slow speed clock (CLK2) of the second clock domain, along with an example of the relative timing of the signals present at points A, B, C, D and E illustrated in FIG. 2A.

At point 300, the first interrupt signal is generated following the rising edge of clock signal CLK2, and following a slight delay, a corresponding second interrupt signal is generated at point 320, the slight delay being due to the presence of AND gate 130. At point 330, the re-synchronised first interrupt signal is generated following a rising edge of the fast clock CLK1 in the first clock domain.

At some subsequent point, the processor will cause the clear request signal to be generated, this appearing at point 340 following a rising edge of clock CLK1. On the following rising edge of CLK1, the clear request signal is de-asserted at point 350. Additionally, on that rising edge of CLK1, the clear signal output by flip flop 190 is produced at point 360. This will cause the second interrupt signal to be de-asserted at step 370 following a slight delay due to the presence of inverter 195 and AND gate 130.

The clear signal output by the clear generation logic is then maintained until some subsequent time when the first interrupt signal is de-asserted by the interrupt source, this occurring at point 380 following a rising edge of the slow clock CLK2. This will cause the re-synchronised first interrupt signal to fall to a logic zero value at point 390 following a rising edge of clock CLK1. Then, on the next rising edge of clock CLK1, the output of the flip flop 190 will transition to a logic zero value, as indicated at point 395.

It will be appreciated that the circuitry illustrated in FIG. 2A is merely an example of circuitry which can be included within the logic unit to produce the required functionality. FIGS. 3 and 4 illustrate examples of alternative circuitry which may be used. In FIG. 2A, the inverter 195 and AND gate 130 operate as output logic arranged to conditionally output the first interrupt signal as the second interrupt signal dependent of whether the control signal is asserted. FIG. 3 illustrates an alternative embodiment that avoids the requirement for inverter 195. Instead of inverter 195, the flip flop 190 is replaced by a flip flop 200 which also produces an inverted version of the signal it outputs on path 135. This inverted output is provided directly over path 210 to the AND gate 130. Other than this modification, the remaining circuitry in FIG. 3 is identical to that in FIG. 2A. As can be seen from FIG. 3, as soon as the clear signal is generated on path 135, an inverted version of the clear signal is generated as a control signal over path 210. Accordingly, as soon as the clear signal is generated, the second interrupt signal will cease to be output over path 140, due to the presence of a logic zero value on path 210.

FIG. 4 illustrates an alternative embodiment in which the AND gate 130 and inverter 195 of FIG. 2A are replaced by NOR gates 220 and 230. In the initial state, a logic zero value will be present on path 100, and also on path 240, and accordingly NOR gate 220 will output a logic one value to NOR gate 230. Thus, independent of the value on path 250, the output of NOR gate 230 will be a logic zero value. When the first interrupt signal is generated by the interrupt source, the input of NOR gate 220 connected to path 100 will transition to a logic one value, causing the output of the NOR gate to be at a logic zero value. Path 250 will also be at a logic zero value, and accordingly the output of NOR gate 230 will transition to a logic one value, thereby producing the second interrupt signal.

As described earlier with reference to FIG. 2A, when the clear request signal is produced on path 160, this will result in the clear signal being generated on path 135 at a logic one value, thereby causing the signal over path 250 to input a logic one value to NOR gate 230, causing the second interrupt signal to be de-asserted (i.e. to transition to a logic zero value). Then, when the first interrupt signal is de-asserted in response to the clear signal output over path 135, this will cause the inputs to NOR gate 220 to both become logic zero values, thereby causing NOR gate 220 to output a logic one value. Hence, even though the signal on path 135 will then be reset to a logic zero value, and accordingly the input to NOR gate 230 over path 250 will become a logic zero value, the output of NOR gate 230 will remain at a logic zero value.

Although a particular embodiment of the invention has been described herein, it will be apparent that the invention is not limited thereto, and that many modifications and additions may be made within the scope of the invention. For example, various combinations of the features of the following dependent claims could be made with the features of the independent claims without departing from the scope of the present invention.

I claim:

1. A logic unit for coupling to a bus operating in a first clock domain, and for interfacing between the bus and a device operating in a second clock domain, the frequency of the second clock domain being less than the frequency of the first clock domain, the logic unit comprising:

an interrupt source, responsive to a signal issued by the device, for asserting a first interrupt signal in the second clock domain;

output logic, responsive to the first interrupt signal, to output a second interrupt signal via the bus to a processor operating in the first clock domain, the processor being arranged to process the interrupt indicated by the second interrupt signal, and to issue a clear request signal at a predetermined point during processing of the interrupt;

clear generation logic arranged, whilst the first interrupt signal is asserted, to be responsive to receipt of the clear request signal to assert a clear signal to the interrupt source and to assert a control signal to the output logic;

the output logic being responsive to receipt of the control signal to stop outputting the second interrupt signal;

the interrupt source being responsive to the clear signal to de-assert the first interrupt signal, the de-assertion of the first interrupt signal causing a clear acknowledge signal to be generated;

the clear generation logic being responsive to the clear acknowledge signal to de-assert the clear signal.

2. A logic unit as claimed in claim 1, wherein the clear generation logic is arranged to receive the first interrupt signal, and the de-asserted first interrupt signal forms the clear acknowledge signal.

3. A logic unit as claimed in claim 2, wherein the clear generation logic is arranged to operate in the first clock domain, and the logic unit further comprises resynchronisation logic for resynchronising the first interrupt signal to the first clock domain.

4. A logic unit as claimed in claim 1, wherein the clear generation logic is arranged to receive the clear request signal as a set signal and the clear acknowledge signal as a reset signal, whereby the clear generation logic is arranged to assert the clear signal upon receipt of the clear request signal, and to maintain the clear signal until the clear acknowledge signal is received, at which point the clear signal is de-asserted.

5. A logic unit as claimed in claim 4, wherein the clear generation logic comprises a first logic element arranged to receive the clear request signal and the output of the clear generation logic and a second logic element arranged to receive the output of the first logic element and the clear acknowledge signal, the two logic elements being arranged such that the clear signal is asserted upon receipt of the clear request signal, and is maintained irrespective of whether the clear request signal is maintained until such time as the clear acknowledge signal is received.

6. A logic unit as claimed in claim 1, wherein the output logic comprises a logic gate arranged to conditionally output the first interrupt signal as the second interrupt signal dependent on whether the control signal is asserted.

7. A logic unit as claimed in claim 6, wherein the clear signal forms the control signal, and the output logic comprises an inverter for inverting the control signal, and a logical AND gate for receiving the first interrupt signal and the inverted control signal, whereby the first interrupt signal is output as the second interrupt signal until the clear signal is asserted, at which point the logical AND gate stops outputting the second interrupt signal.

8. A logic unit as claimed in claim 6, wherein the clear signal forms the control signal, and the output logic comprises a logical NOR gate for receiving an inverted version of the first interrupt signal and the control signal, whereby the first interrupt signal is output as the second interrupt signal. until the clear signal is asserted, at which point the logical NOR gate stops outputting the second interrupt signal.

9. A logic unit as claimed in claim 6, wherein the clear generation logic is arranged to generate the control signal as an inverted version of the clear signal, and the output logic comprises a logical AND gate for receiving the first interrupt signal and the control signal, whereby the first interrupt signal is output as the second interrupt signal until the clear signal is asserted, at which point the logical AND gate stops outputting the second interrupt signal.

10. A logic unit as claimed in claim 1, wherein the clear generation logic is arranged to operate in the first clock domain, and the logic unit further comprises resynchronisation logic for resynchronising the first interrupt signal to the first clock domain, the logic unit further comprising a register for storing as interrupt status information the first interrupt signal as resynchronised to the first clock domain, the register being accessible by the processor during processing of the interrupt.

11. An integrated circuit comprising:

a processor for processing interrupts;

a logic unit as claimed in claim 1; and a bus for coupling the logic unit and the processor.

12. An integrated circuit as claimed in claim 11, further comprising an interrupt controller coupled to the bus, and arranged to receive the second interrupt signal from the output logic, and to determine when to pass the interrupt to the processor for processing.

* * * * *